United States Patent
Shiraishi et al.

(10) Patent No.: US 8,514,348 B2
(45) Date of Patent: Aug. 20, 2013

(54) LIQUID CRYSTAL DISPLAY DEVICE USING LIGHT GUIDE PLATE

(75) Inventors: Yasuhisa Shiraishi, Mobara (JP); Atsushi Tsuruoka, Mobara (JP); Shigeki Nishizawa, Mobara (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 203 days.

(21) Appl. No.: 13/038,407

(22) Filed: Mar. 2, 2011

(65) Prior Publication Data

US 2011/0216268 A1 Sep. 8, 2011

(30) Foreign Application Priority Data

Mar. 2, 2010 (JP) ................ 2010-044947

(51) Int. Cl.
- *G02F 1/1335* (2006.01)
- *F21V 7/04* (2006.01)

(52) U.S. Cl.
USPC ............................ 349/65; 362/615

(58) Field of Classification Search
USPC ..................... 349/62, 65; 362/615
See application file for complete search history.

(56) References Cited

U.S. PATENT DOCUMENTS

| | | | | |
|---|---|---|---|---|
| 5,712,694 | A * | 1/1998 | Taira et al. | 349/9 |
| 7,046,318 | B2 * | 5/2006 | Yu et al. | 349/64 |
| 7,052,168 | B2 * | 5/2006 | Epstein et al. | 362/625 |
| 8,182,129 | B2 * | 5/2012 | Teng et al. | 362/617 |
| 2009/0284688 | A1 | 11/2009 | Shiraishi et al. | |

FOREIGN PATENT DOCUMENTS

JP 2009-276531 11/2009

* cited by examiner

*Primary Examiner* — Mark Robinson
*Assistant Examiner* — Robert Tavlykaev
(74) *Attorney, Agent, or Firm* — Antonelli, Terry, Stout & Kraus, LLP.

(57) ABSTRACT

A light guide plate is for reflecting incident light from an end surface thereof in an inside to obtain surface emission from a front surface thereof. The light guide plate includes protrusions and recesses formed on one of the front surface and a rear surface on an opposite side of the front surface. The protrusions and recesses are formed of a shape in which first mountain-range shapes each including a first ridge continuing along a first direction, which is a direction toward the inside from the end surface, and second mountain-range shapes each including a second ridge continuing along a second direction intersecting with the first direction are combined. Each first mountain-range shape includes a pair of first side surfaces on both sides of the first ridge. Each second mountain-range shape includes a pair of second side surfaces on both sides of the second ridge.

9 Claims, 4 Drawing Sheets

LIQUID CRYSTAL DISPLAY DEVICE USING LIGHT GUIDE PLATE

CROSS-REFERENCE TO RELATED APPLICATION

The present application claims priority from Japanese application JP 2010-044947 filed on Mar. 2, 2010, the content of which is hereby incorporated by reference into this application.

BACKGROUND OF THE INVENTION

1. Field of the Invention

The present invention relates to a light guide plate and a liquid crystal display device using the same.

2. Description of the Related Art

In a liquid crystal display device including a side-light type or edge-light type backlight, light having entered an end surface of a light guide plate travels inside the light guide plate and reflects off an interface on the rear surface side to exit from the front surface thereof (see Japanese Patent Application Laid-open No. 2009-276531). The surface-emitted light from the light guide plate enters a liquid crystal display panel after passing through a polarizer which transmits only light polarized in a particular direction of oscillation (linearly-polarized light or plane-polarized light).

The light traveling inside the light guide plate has a component which reflects off an interface on the light exit surface side when exiting therefrom and remains inside the light guide plate. This is one of the light loss factors. Further, light that the polarizer blocks is absorbed by the polarizer even if the light exits from the light guide plate. This is another light loss factor.

SUMMARY OF THE INVENTION

It is an object of the present invention to provide a light guide plate capable of reducing light loss and a liquid crystal display device using the same.

(1) A light guide plate according to the present invention for reflecting incident light from an end surface of the light guide plate in an inside to obtain surface emission from a front surface thereof, includes protrusions and recesses which are formed on one of the front surface and a rear surface on an opposite side of the front surface, in which: the protrusions and recesses are formed of a shape in which a plurality of first mountain-range shapes and a plurality of second mountain-range shapes are combined, the plurality of first mountain-range shapes each including a first ridge continuing along a first direction, which is a direction toward the inside from the end surface, the plurality of second mountain-range shapes each including a second ridge continuing along a second direction intersecting with the first direction; each of the plurality of first mountain-range shapes includes a pair of first side surfaces on both sides of the first ridge; and each of the plurality of second mountain-range shapes includes a pair of second side surfaces on both sides of the second ridge. According to the present invention, it was revealed from an experiment by the inventors that the formation of the first mountain-range shapes on the rear surface enables the increase in P-polarized light in the exit light from the front surface of the light guide plate. The P-polarized light is lower in reflectivity than the S-polarized light and accordingly has a smaller component which reflects off an interface on the front surface side of the light guide plate to remain in the inside thereof, and hence the light loss can be reduced.

(2) In the light guide plate described in Item (1), the pair of first side surfaces may have a shape symmetrical about the first ridge.

(3) In the light guide plate described in Item (1), the pair of second side surfaces may have a shape asymmetrical about the second ridge.

(4) In the light guide plate described in Item (3), one of the pair of second side surfaces may have a longer length from a base to the second ridge than another of the pair of second side surfaces.

(5) In the light guide plate described in any one of Items (1) to (4), each of the pair of first side surfaces may be a flat surface, and an angle between the pair of first side surfaces may fall within a range between 80° to 130°, inclusive, on an internal side of the first ridge.

(6) In the light guide plate described in any one of Items (1) to (4), each of the pair of first side surfaces may be a convex curved surface.

(7) In the light guide plate described in Item (6), the plurality of first mountain-range shapes may be larger in height than the plurality of second mountain-range shapes, and each of the pair of second side surfaces may be divided into a plurality of pieces by the plurality of first mountain-range shapes.

(8) A liquid crystal display device according to the present invention includes: the light guide plate described in any one of Items (1) to (7); a light source disposed so as to face the end surface of the light guide plate; a liquid crystal display panel disposed on the front surface side of the light guide plate; and a polarizer disposed between the light guide plate and the liquid crystal display panel, in which the polarizer transmits P-polarized light but blocks S-polarized light, the P-polarized light being linearly-polarized light in which an electric field oscillates in a plane including a normal to the front surface of the light guide plate.

DETAILED DESCRIPTION OF THE INVENTION

Figure 1:
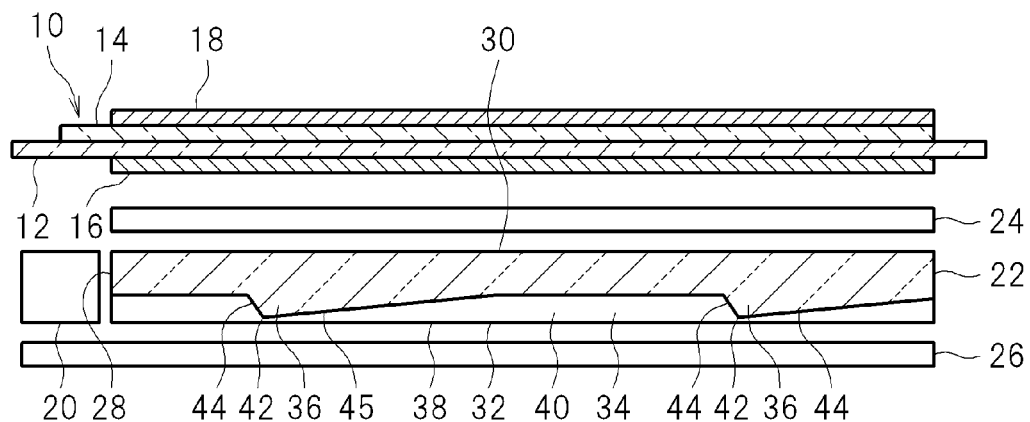
FIG. 1 is an exploded view illustrating an outline of a liquid crystal display device according to an embodiment of the present invention.

Hereinafter, an embodiment of the present invention is described with reference to the accompanying drawings. FIG. 1 is an exploded view illustrating an outline of a liquid crystal display device according to the embodiment of the present invention.

The liquid crystal display device includes a liquid crystal display panel 10. The liquid crystal display panel 10 includes a pair of substrates 12 and 14 made of glass or the like, and liquid crystal (not shown) sandwiched therebetween. The liquid crystal display panel 10 includes polarizers 16 and 18 outside the pair of substrates 12 and 14, respectively.

The liquid crystal display device includes a light source 20. The light source 20 is a point light source or a linear light source such as a light emitting diode (LED), and is converted into a planar light source by a light guide plate 22. The liquid crystal display device includes an optical sheet 24. The optical sheet 24 is disposed between the liquid crystal display panel 10 and the light guide plate 22. A reflective sheet 26 is disposed on the light guide plate 22 on the side opposite to the optical sheet 24 (or the liquid crystal display panel 10).

The liquid crystal display device includes the light guide plate 22. The light guide plate 22 includes an end surface 28 facing the light source 20. The end surface 28 is a light incident surface. The light guide plate 22 includes a front surface 30 from which light exits, and the liquid crystal display panel 10 is disposed on the front surface 30 side. One polarizer 16 is located between the light guide plate 22 and the liquid crystal display panel 10.

Figure 2:
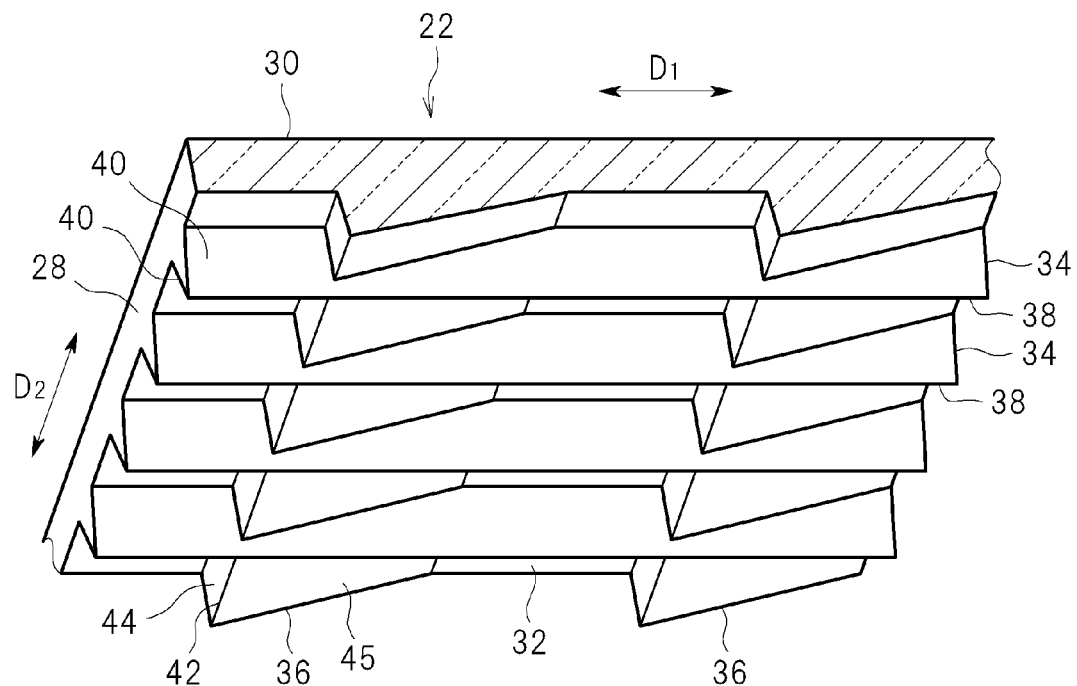
FIG. 2 is a perspective view of a light guide plate.
Figure 3:
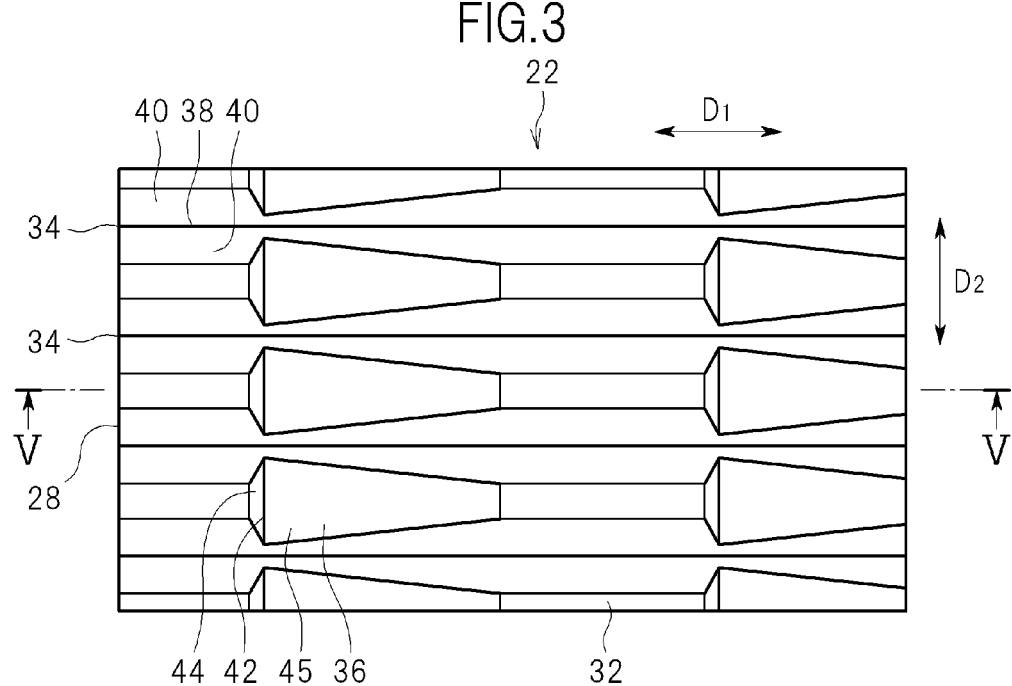
FIG. 3 is a plan view of the light guide plate illustrated in FIG. 2.
Figure 4:
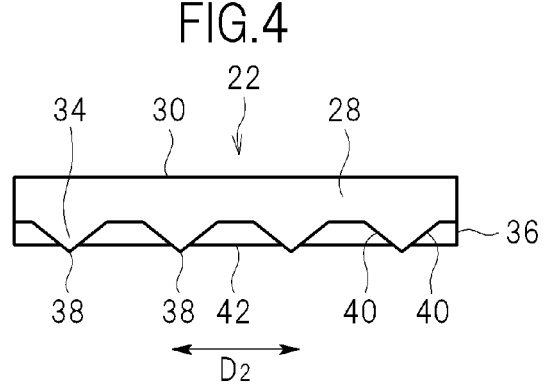
FIG. 4 is a side view of the light guide plate illustrated in FIG. 3.
Figure 5:
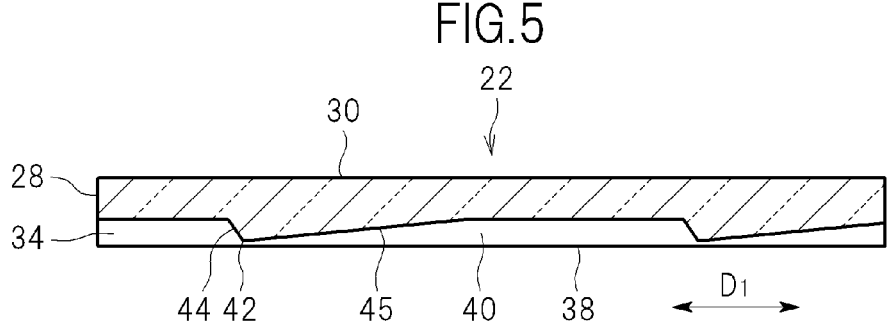
FIG. 5 is a cross-sectional view of the light guide plate illustrated in FIG. 3 taken along the line V-V.

FIG. 2 is a perspective view of the light guide plate 22. FIG. 3 is a plan view of the light guide plate 22. FIG. 4 is a side view of the light guide plate 22 illustrated in FIG. 3. FIG. 5 is a cross-sectional view of the light guide plate 22 illustrated in FIG. 3 taken along the line V-V.

The light guide plate 22 reflects incident light from the end surface 28 in the inside (at the front surface 30 or a rear surface 32) to obtain surface emission from the front surface 30. Protrusions and recesses are formed on the front surface 30 or the rear surface 32 on the opposite side of the front surface 30. The protrusions and recesses are formed of a shape in which a plurality of first mountain-range shapes 34 and a plurality of second mountain-range shapes 36 are combined. The first mountain-range shapes 34 and the second mountain-range shapes 36 are each formed into a prism shape.

The plurality of first mountain-range shapes 34 each have a first ridge 38 continuing along a first direction $D_1$, which is the direction toward the inside from the end surface 28. Each of the first mountain-range shapes 34 includes a pair of first side surfaces 40 on both sides of the first ridge 38. The pair of first side surfaces 40 have a shape symmetrical about the first ridge 38. Each of the pair of first side surfaces 40 is a flat surface. The angle between the pair of first side surfaces 40 falls within a range between 80° to 130°, inclusive, on the internal side of the first ridge 38.

The plurality of second mountain-range shapes 36 each have a second ridge 42 continuing along a second direction $D_2$ intersecting with (e.g., orthogonal to) the first direction $D_1$. Each of the second mountain-range shapes 36 includes a pair of second side surfaces 44 and 45 on both sides of the second ridge 42. Each of the second side surfaces 44 and 45 is divided into a plurality of pieces by the plurality of first mountain-range shapes 34.

The pair of second side surfaces 44 and 45 have a shape asymmetrical about the second ridge 42. One second surface 45 (on the opposite side of the end surface 28) has a longer length from the base to the second ridge 42 than the other second side surface 44 (on the end surface 28 side). In other words, the second side surface 44 on the end surface 28 side has a steeper rise angle than the second side surface 45 on the opposite side of the end surface 28. The first mountain-range shape 34 is larger in height than the second mountain-range shape 36, but conversely the second mountain-range shape 36 may be larger in height than the first mountain-range shape 34.

Next, description is given of light traveling inside the light guide plate 22, but before that, general characteristics of light are described. Light is an electromagnetic wave oscillating perpendicularly to the travel direction. Of the light, linearly-polarized light or plane-polarized light is divided into P-polarized light and S-polarized light when reflecting off the surface, depending on the relation to the reflecting surface. Specifically, the P-polarized light is linearly-polarized light in which the electric field oscillates in a plane including the normal to the reflecting surface and the travel direction of light (or a plane including the travel directions of incident light and reflection light). On the other hand, the S-polarized light is linearly-polarized light in which the electric field oscillates in a place perpendicular to the plane including the normal to the reflecting surface and the travel direction of light (or a plane perpendicular to the plane including the travel directions of incident light and reflection light). When comparing the P-polarized light and the S-polarized light, the S-polarized light has properties of larger reflectivity than that of the P-polarized light.

Therefore, when exiting from inside the light guide plate 22, the S-polarized light is likely to reflect off the internal part of the front surface 30 to remain inside the light guide plate 22. In other words, the S-polarized light has a large loss.

In this embodiment, the first mountain-range shapes 34 are formed, and hence the S-polarized light is converted into the P-polarized light when reflecting off toward the inside, with the pair of first side surfaces 40 as the interfaces. The light reflects off one first side surface 40, followed by reflecting off another first side surface 40, that is, the light reflects off twice. Because the S-polarized light is converted into the P-polarized light in this way, the exit light from the front surface 30 of the light guide plate 22 has a high proportion of P-polarized light.

Figure 6:
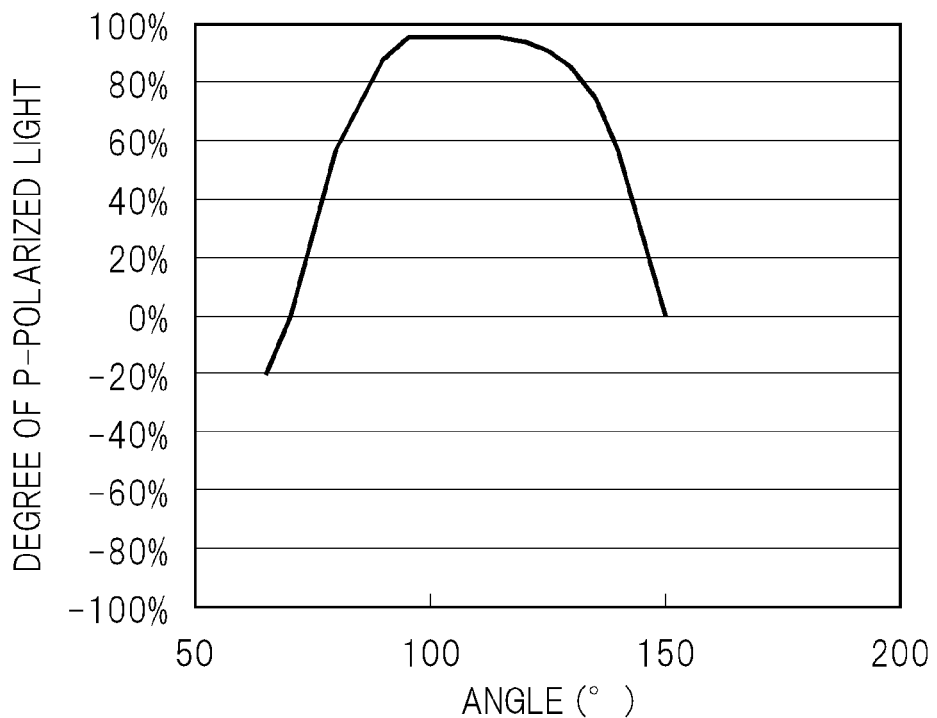
FIG. 6 is a graph illustrating results of an experiment on the light guide plate.

The inventors of the present invention carried out an experiment for measuring the characteristics of the light guide plate 22 according to this embodiment. FIG. 6 is a graph illustrating results of the experiment on the light guide plate 22. This experiment measured the proportion of P-polarized light which exited when S-polarized light entered the light guide plate 22. The measurement was carried out while varying the angle between the pair of first side surfaces 40, and the angle is shown on the abscissa axis. The ordinate axis represents the proportion of P-polarized light. It was found from the results of the experiment that almost all of the exit light components were P-polarized light when the angle between the pair of first side surfaces 40 fell within a range between 90° to 130°. In other words, it was found that almost all of the S-polarized light components were converted into the P-polarized light.

Figure 7:
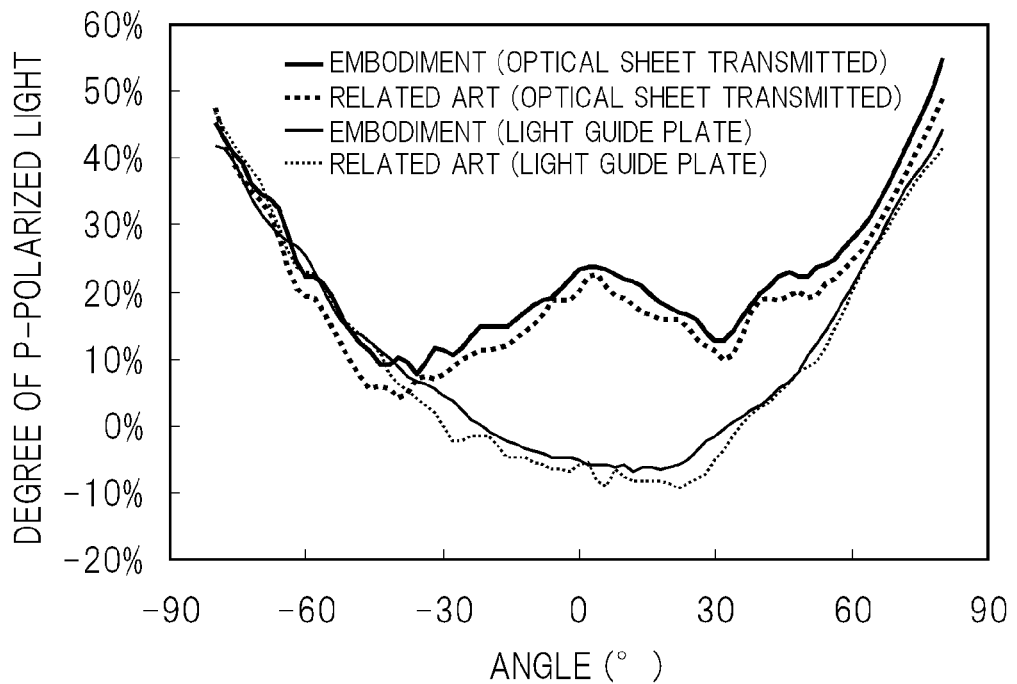
FIG. 7 is a graph illustrating results of a comparative experiment.

Further, a comparative experiment between the light guide plate 22 according to this embodiment and a conventional light guide plate was carried out. FIG. 7 is a graph illustrating results of the comparative experiment. This experiment measured the ratio of P-polarized light occupied in the exit light from the front surface 30 of the light guide plate 22 when natural light entered the light guide plate 22. Note that, the angle between the pair of first side surfaces 40 of the light guide plate 22 used as this embodiment is 130°. The angle on the abscissa axis is an angle formed between the normal to the front surface 30 of the light guide plate 22 and the direction of the exit light, and the negative angle indicates a return direction with respect to the direction of light traveling toward the inside of the light guide plate 22 from the end surface 28 thereof. The light guide plate used as the related art (not shown) has a shape obtained by removing the first mountain-range shapes 34 but leaving the second mountain-range shapes 36 from the light guide plate 22 according to this embodiment, in which the respective second mountain-range shapes 36 are not divided but formed into a continuous shape.

It was found from the results of the experiment that the light guide plate 22 according to this embodiment had a higher proportion of P-polarized light than that of the conventional light guide plate. Further, the same results were also obtained when the measurement was carried out on light that passed through the optical sheet 24 after exiting from the light guide plate 22.

According to this embodiment, it was revealed from the experiments by the inventors that the formation of the first mountain-range shapes 34 enables the increase in P-polarized light in the exit light from the front surface 30 of the light guide plate 22. The P-polarized light is lower in reflectivity than the S-polarized light and accordingly has a smaller component which reflects off the interface on the front surface 30 side of the light guide plate 22 to remain the inside thereof, and hence the light loss can be reduced.

Because the light guide plate 22 is structured as described above, the polarizer 16 that the exit light from the light guide plate 22 enters (see FIG. 1) is set so as to transmit the P-polarized light. Although the S-polarized light has a large loss, the S-polarized light contains a component which exits from the light guide plate 22. The component is, however, absorbed by the polarizer 16. In other words, the polarizer 16 transmits the P-polarized light, which is linearly-polarized light in which the electric field oscillates in the plane including the normal to the front surface 30 of the light guide plate 22, but does not transmit the S-polarized light. However, according to the light guide plate 22 of this embodiment, the proportion of P-polarized light is large and the proportion of S-polarized light is small, and hence the liquid crystal display device using the light guide plate 22 has a small light loss.

Figure 8:
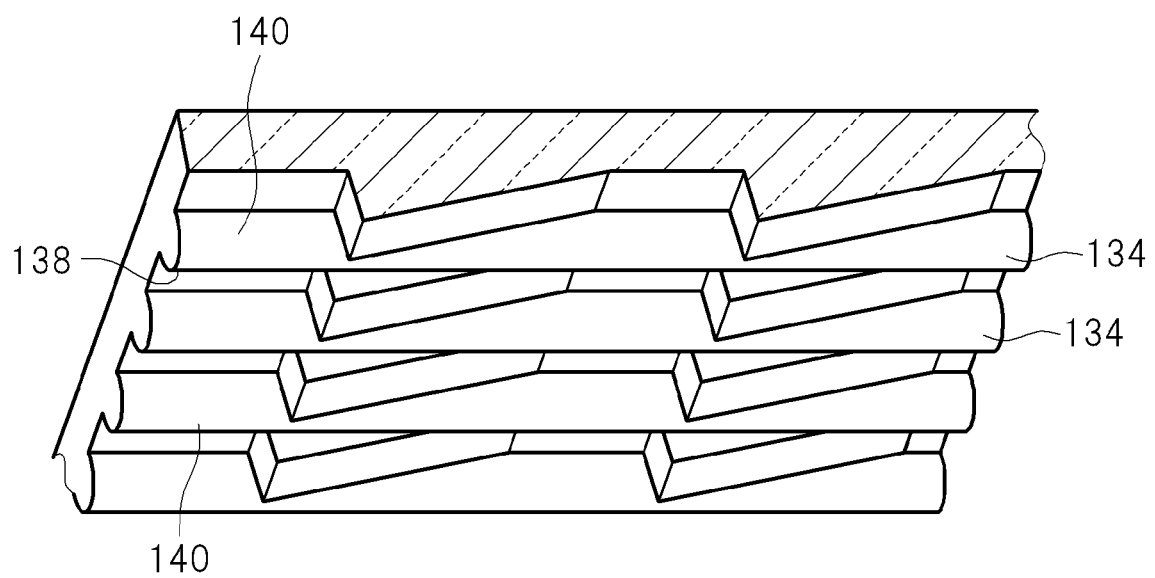
FIG. 8 is a perspective view illustrating a modified example of the light guide plate according to the embodiment of the present invention.

FIG. 8 is a perspective view illustrating a modified example of the light guide plate according to this embodiment. In this example, a pair of first side surfaces 140 of a first mountain-range shape 134 each has a convex curved surface. For example, each of the pair of first side surfaces 140 draws a curve in a cross-section perpendicular to the extending direction of a first ridge 138 of the first mountain-range shape 134. Other structures correspond to those described in the above-mentioned embodiment.

The present invention is not limited to the embodiment described above, and various modifications may be made thereto. For example, the structures described in the embodiment may be replaced by substantially the same structure, a structure having the same action and effect, and a structure which may achieve the same object.

What is claimed is:

1. A liquid crystal display device, comprising:
    a light guide plate for reflecting incident light from an end surface of the light guide plate in an inside to obtain surface emission from a front surface thereof,
    the light guide plate comprising protrusions and recesses which are formed on a rear surface on an opposite side of the front surface;
    a light source disposed so as to face the end surface of the light guide plate;
    a liquid crystal display panel disposed on the front surface side of the light guide plate; and
    a polarizer disposed between the light guide plate and the liquid crystal display panel;
    wherein the protrusions and recesses are formed of a shape in which a plurality of first mountain-range shapes and a plurality of second mountain-range shapes are combined;
        wherein each of the plurality of first mountain-range shapes includes a first ridge continuing along a first direction, which is a direction toward the inside from the end surface;
        wherein each of the plurality of second mountain-range shapes includes a second ridge continuing along a second direction intersecting with the first direction;
    wherein each of the plurality of first mountain-range shapes includes a pair of first side surfaces on both sides of the first ridge;
    wherein each of the plurality of second mountain-range shapes includes a pair of second side surfaces on both sides of the second ridge;
    wherein an angle between the pair of first side surfaces is between 90° to 130°; and
    wherein the polarizer transmits P-polarized light but blocks S-polarized light, the P-polarized light being linearly-polarized light in which an electric field oscillates in a plane including the first direction and a normal to the front surface of the light guide plate.

2. The liquid crystal display device according to claim 1, wherein the pair of first side surfaces have a shape symmetrical about the first ridge.

3. The liquid crystal display device according to claim 1, wherein the pair of second side surfaces have a shape asymmetrical about the second ridge.

4. The liquid crystal display device according to claim 3, wherein one of the pair of second side surfaces has a longer length from a base to the second ridge than the other one of the pair of second side surfaces.

5. The liquid crystal display device according to claim 1, wherein each of the pair of first side surfaces comprises a flat surface.

6. The liquid crystal display device according to claim 1, wherein each of the pair of first side surfaces comprises a convex curved surface.

7. The liquid crystal display device according to claim 6, wherein the plurality of first mountain-range shapes are larger in height than the plurality of second mountain-range shapes, and wherein each of the pair of second side surfaces is divided into a plurality of pieces by the plurality of first mountain-range shapes.

8. The light crystal display device according to claim 1, wherein the angle between the pair of first side surfaces enables an increase of the P-polarized light emitted from the front face of the light guide plate toward the polarizer.

9. The light crystal display device according to claim 1, wherein the angle between the pair of first side surfaces enables substantially all of the light emitted from the front face of the light guide plate toward the polarizer to be P-polarized light.

* * * * *